US011105688B2

(12) United States Patent  
Suzuki et al.

(10) Patent No.: US 11,105,688 B2  
(45) Date of Patent: Aug. 31, 2021

(54) ATTACHING A THERMISTOR ON A CASE

(71) Applicant: SHIBAURA ELECTRONICS CO., LTD., Saitama (JP)

(72) Inventors: Tatsuyuki Suzuki, Saitama (JP); Toshiyuki Okumura, Aomori (JP)

(73) Assignee: SHIBAURA ELECTRONICS CO., LTD., Saitama (JP)

( * ) Notice: Subject to any disclaimer, the term of this patent is extended or adjusted under 35 U.S.C. 154(b) by 243 days.

(21) Appl. No.: 16/090,469

(22) PCT Filed: Jan. 16, 2017

(86) PCT No.: PCT/JP2017/001262  
§ 371 (c)(1),  
(2) Date: Oct. 1, 2018

(87) PCT Pub. No.: WO2018/131164  
PCT Pub. Date: Jul. 19, 2018

(65) Prior Publication Data  
US 2019/0120697 A1    Apr. 25, 2019

(51) Int. Cl.  
*G01K 7/00* (2006.01)  
*G01K 1/14* (2021.01)  
(Continued)

(52) U.S. Cl.  
CPC ............... *G01K 1/14* (2013.01); *G01K 1/08* (2013.01); *G01K 7/22* (2013.01); *G01K 2007/163* (2013.01)

(58) Field of Classification Search  
CPC combination set(s) only.  
See application file for complete search history.

(56) References Cited

U.S. PATENT DOCUMENTS 5,749,656 A * 5/1998 Boehm ............... G01K 7/22  
 338/28  
2004/0141545 A1  7/2004 Hoshisashi et al.  
(Continued)

FOREIGN PATENT DOCUMENTS

FR    2652951 A1 *  4/1991  ............... G01K 7/16  
JP    H02-80982 U1   6/1990  
(Continued)

OTHER PUBLICATIONS

Supplementary European Search Report for EP 17891278 dated Apr. 3, 2019.  
(Continued)

*Primary Examiner* — Lisa M Caputo  
*Assistant Examiner* — Nasir U. Ahmed  
(74) *Attorney, Agent, or Firm* — Pearne & Gordon LLP

(57) ABSTRACT

A temperature-sensitive element including an element main body and a pair of lead wires that is drawn out from the element main body; a case accommodating the temperature-sensitive element and having a heat transfer surface configured to come into contact with a measurement object for temperature; a pair of lead frames electrically connected with each of the lead wires and drawn out from the case; and a filler covering the temperature-sensitive element accommodated in the case and the lead frames and holding the temperature-sensitive element and the lead frames in the case while maintaining a state of the connection.

20 Claims, 6 Drawing Sheets

(51) Int. Cl.
  *G01K 7/22* (2006.01)
  *G01K 1/08* (2021.01)
  *G01K 7/16* (2006.01)

(56) References Cited

U.S. PATENT DOCUMENTS

| | | | |
|---|---|---|---|
| 2009/0323765 A1* | 12/2009 | Yokoi | G01K 7/22 |
| | | | 374/185 |
| 2012/0026659 A1 | 2/2012 | Kim et al. | |
| 2012/0125130 A1* | 5/2012 | Stoll | G01K 13/02 |
| | | | 73/866.5 |
| 2013/0208765 A1* | 8/2013 | Takahashi | G01K 7/22 |
| | | | 374/185 |
| 2015/0118919 A1* | 4/2015 | Duenkel | H01R 13/33 |
| | | | 439/877 |
| 2016/0013567 A1* | 1/2016 | Sakaguchi | H01R 4/188 |
| | | | 439/877 |

FOREIGN PATENT DOCUMENTS

| | | |
|---|---|---|
| JP | H04-24032 U1 | 2/1992 |
| JP | 2005-283149 A | 10/2005 |
| JP | 2013-15430 A | 1/2013 |

OTHER PUBLICATIONS

International Search Report for PCT/JP2017/001262 dated Feb. 7, 2017.

\* cited by examiner

FIG. 6A
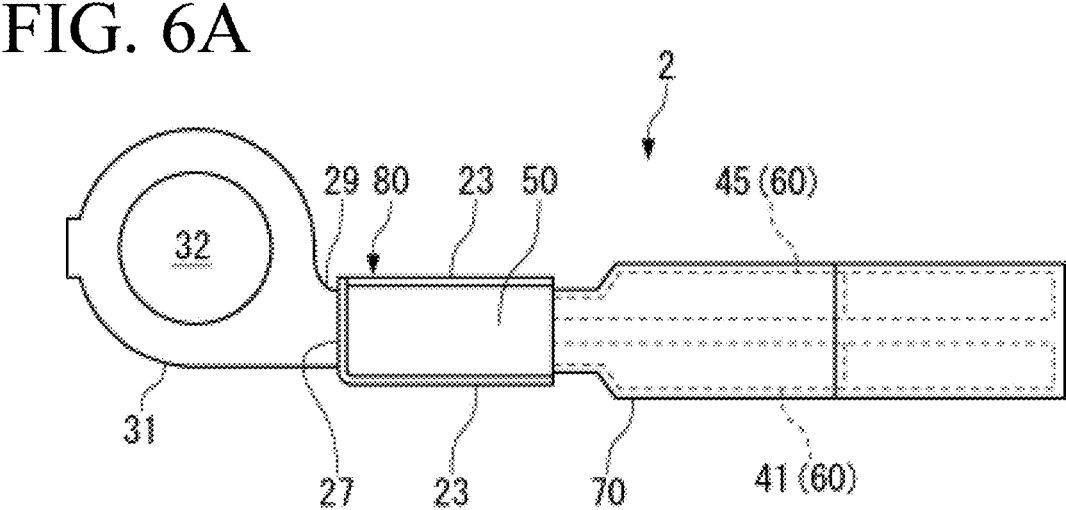
FIG. 6B
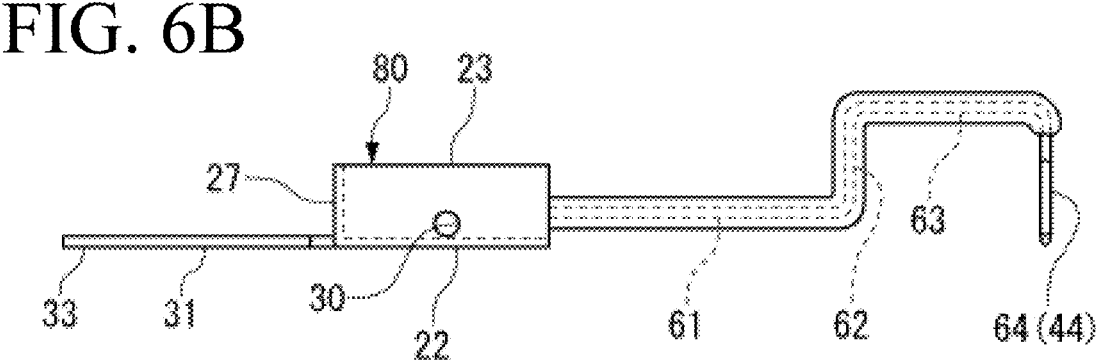
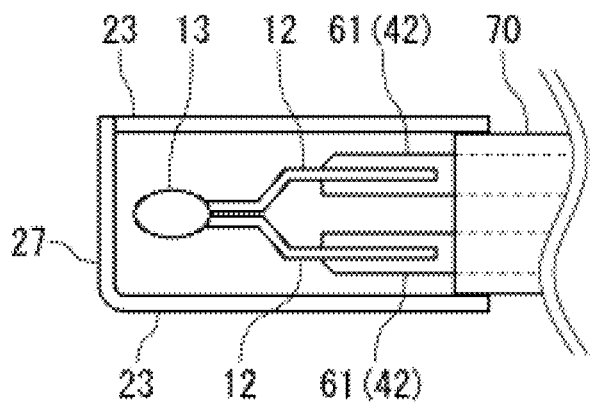
FIG. 6C

ATTACHING A THERMISTOR ON A CASE

This is the National Stage of PCT international application PCT/JP2017/001262 filed on Jan. 16, 2017, which is incorporated herein by reference in its entirety.

TECHNICAL FIELD

The present invention relates to a temperature sensor suitable for measuring the temperature of a measurement object in a state where the temperature sensor is mounted on a board, for example.

BACKGROUND ART

A temperature sensor using a thermistor that is a temperature-sensitive semiconductor element is utilized in various uses and fields.

As the temperature sensor, although various types exist, for example, there is known a temperature sensor including a sensor main body, a sensor fitting terminal to which the sensor main body is attached, and lead wires that are drawn out from the sensor main body, as described in Patent Literature 1. In the temperature sensor, the sensor main body is constituted by a thermistor having the property that the resistance value changes depending on temperature.

A temperature sensor described in Patent Literature 1 is fixed to a measurement object by screwing, through a screw fitting hole formed on the sensor fitting terminal.

Further, the temperature sensor described in Patent Literature 1 is electrically connected with a circuit for detecting the temperature, through connectors fitted to distal ends of the lead wires, and the lead wires serve for the electrical connection with the circuit.

CITATION LIST

Patent Literature

Patent Literature 1: JP 2013-15430 A

SUMMARY OF INVENTION

Technical Problem

When the temperature sensor described in Patent Literature 1 is mounted on, for example, a circuit board that is an attachment object, it is necessary to perform at least two steps: a step of fixing the temperature sensor to the circuit board and a step of inserting the lead wires or the connectors fitted to the lead wires into insertion holes provided on the circuit board.

However, it is desirable to reduce the workload by decreasing the steps when the temperature sensor is mounted on the circuit board, for example.

Hence, the present invention has an object to provide a temperature sensor that makes it possible to reduce the workload when the temperature sensor is mounted on an attachment object.

Solution to Problem

A temperature sensor in the present invention includes: a temperature-sensitive element including an element main body and a pair of lead wires that is drawn out from the element main body; a case accommodating the temperature-sensitive element and having a heat transfer surface configured to come into contact with a measurement object for temperature; a pair of lead frames electrically connected with each of the lead wires and drawn out from the case; and a filler covering the temperature-sensitive element accommodated in the case and the lead frames and holding the temperature-sensitive element and the lead frames in the case while maintaining a state of the connection.

The lead frames have a higher rigidity than electrical wires, and therefore, it is possible to insert the lead frames into, for example, insertion holes of a circuit board, simply by attaching the case to the attachment object after position adjustment. Therefore, according to the temperature sensor in the present invention, it is possible to decrease work steps when the temperature sensor is mounted on the circuit board, and it is possible to enhance the work efficiency.

Further, the lead frames do not occupy the space in the periphery of the circuit board, because it is not necessary to provide a length margin for inserting the distal ends into the insertion holes, unlike electrical wires. Therefore, it is possible to achieve space saving.

It is preferable that the filler in the present invention cover at least a part of connection portions between the lead wires and the lead frames, in an interior of the case or in the interior and exterior of the case. Thereby, it is possible to secure the electrical connection state between the lead wires and the lead frames.

It is preferable that the case in the present invention surround the filler. Thereby, in a wide area, heat is transferred to the temperature-sensitive element through the filler, and therefore, it is possible to rapidly transfer the temperature of the measurement object to the temperature-sensitive element.

It is preferable that the case in the present invention include a lug terminal having the heat transfer surface, the lug terminal being configured to fix the case to the measurement object. Thereby, it is possible to make the heat transfer surface tightly contact with the measurement object, and therefore, it is possible to accurately measure the temperature of the measurement object.

It is preferable that the temperature sensor in the present invention be configured to measure the temperature of the measurement object while being attached to an attachment object, and the case include a connection part on a side opposing to the heat transfer surface, the connection part being configured to serve for connection with the attachment object. Thereby, it is possible to stably attach the case to the attachment object.

It is preferable that the case in the present invention include a support configured to regulate a relative positional relationship between the attachment object and the heat transfer surface. Thereby, it is possible to attach the temperature sensor to the attachment object through the case, at a proper attitude or position. When the support in the present invention is provided at a plurality of locations in a front-rear direction in which the lead frames are drawn out, the plurality of locations being configured to interpose the connection part, it is possible to attach the temperature sensor to the attachment object at a more proper attitude or position.

It is preferable that the pair of lead frames in the present invention include a spacer configured to maintain an interval between them. Thereby, it is possible to improve the mechanical strength of the lead frames, while avoiding the contact between the pair of lead frames, even when the lead frames are vibrated.

Advantageous Effects of Invention

According to the temperature sensor in the present invention, it is possible to reduce the workload when the temperature sensor is mounted on the attachment object, for example, a circuit board, and to enhance the work efficiency for mounting.

BRIEF DESCRIPTION OF DRAWINGS

FIG. 1A is a plan view, and FIG. 1B is a side view.

FIG. 2A is a sectional view taken along an arrow IIa-IIa in FIG. 1A, and FIG. 2B is an enlarged view of a portion IIb in FIG. 1A.

FIG. 5A is a plan view, FIG. 5B is a side view, and FIG. 5C is a plan view of another modification.

FIG. 6A, FIG. 6B and FIG. 6C each show a temperature sensor according to a second embodiment of the present invention, FIG. 6A is a plan view, FIG. 6B is a side view, and FIG. 6C is an internal structure diagram in a state where a filler is not filled.

DESCRIPTION OF EMBODIMENTS

Figure 1A:
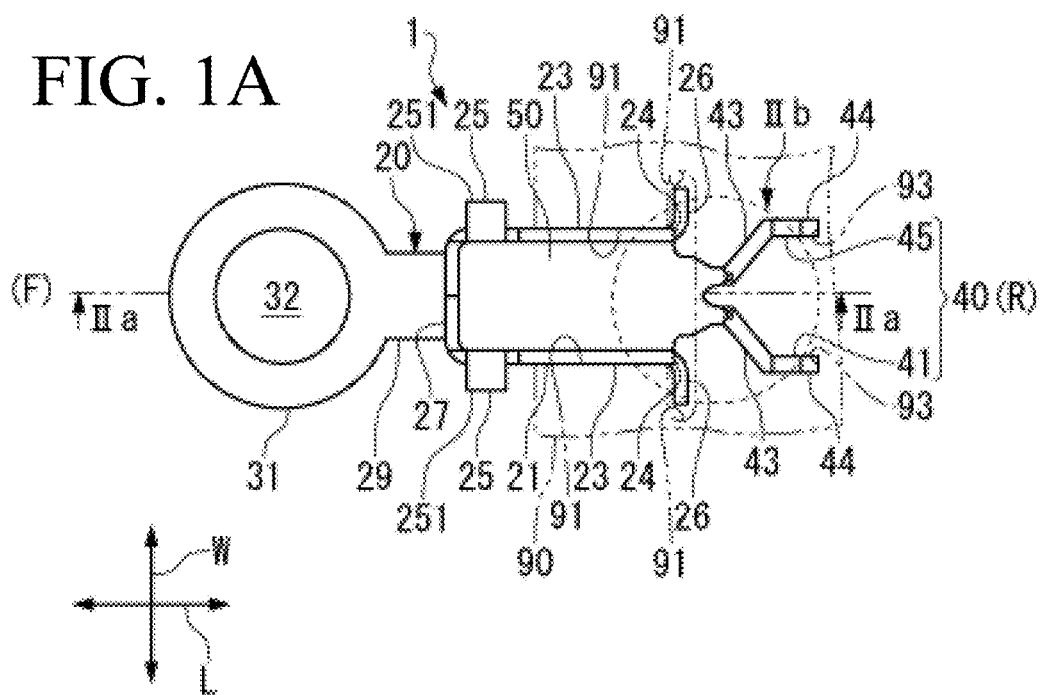
FIG. 1A and FIG. 1B each show a temperature sensor according to a first embodiment of the present invention.

Hereinafter, temperature sensors according to the present invention will be described based on embodiments.

First Embodiment

As shown in FIG. 1A, FIG. 1B, FIG. 2A and FIG. 2B, a temperature sensor 1 includes a temperature-sensitive element 10, a case 20 accommodating the temperature-sensitive element 10, lead frames 40 electrically connected with the temperature-sensitive element 10, a filler 50 holding the temperature-sensitive element 10 accommodated in the case 20 and the lead frames 40 in the case 20.

Figure 1B:
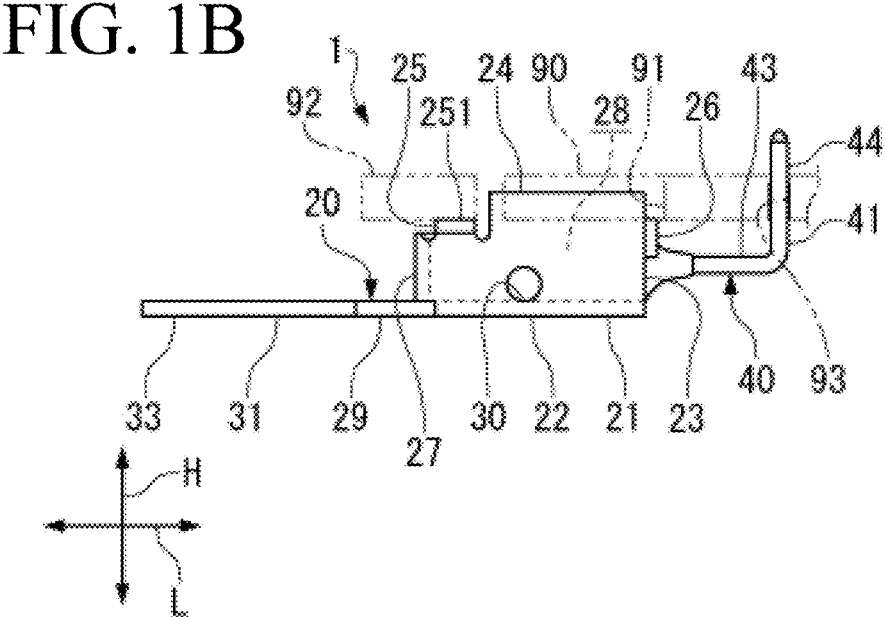

The temperature sensor 1 according to the first embodiment is characterized in that the lead frames 40 serve for the electrical connection with a circuit board 90 that is an attachment object, as shown in FIG. 1B. The constituent elements of the temperature sensor 1 will be described below in order.

In the temperature sensor 1, the front (F) is defined as a side on which a lug terminal portion 31 of the case 20 is provided, and the rear (R) is defined as the opposite side, that is, a side from which the lead frames 40 are drawn out. Further, in the temperature sensor 1, a longitudinal direction L, a width direction W and a height direction H are defined as shown in FIG. 1A and FIG. 1B.

[Temperature-Sensitive Element 10]

Figure 2A:
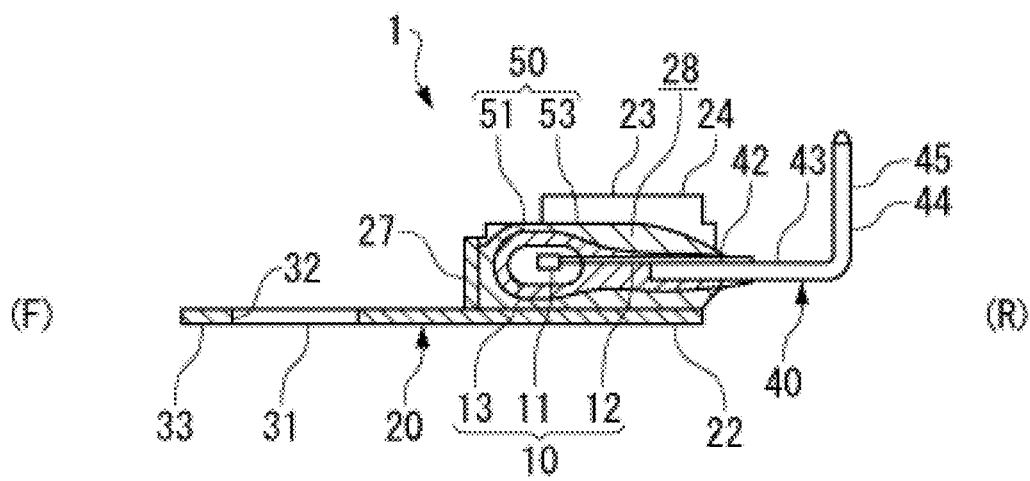
FIG. 2A and FIG. 2B each show the temperature sensor according to the first embodiment of the present invention.
Figure 2B:
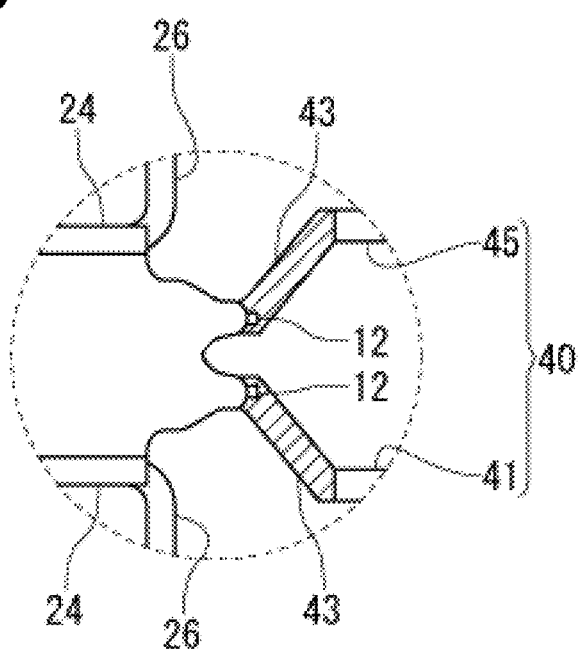
Figure 3A:
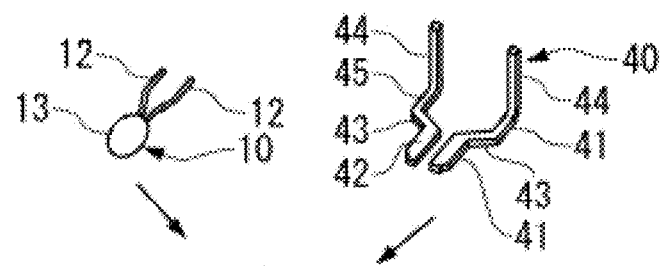
FIG. 3A, FIG. 3B, FIG. 3C and FIG. 3D each are a diagram showing a production procedure for the temperature sensor according to the first embodiment of the present invention.
Figure 3B:
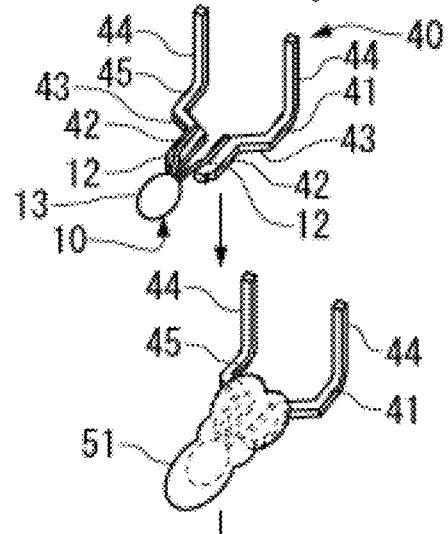
Figure 3C:
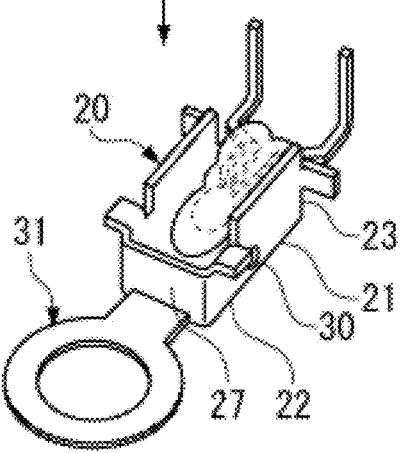
Figure 3D:
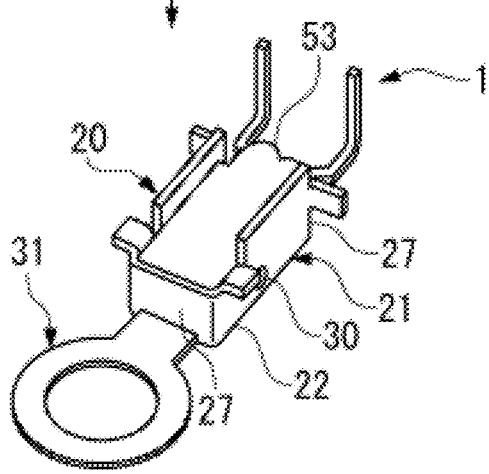

As shown in FIG. 2A and FIG. 2B, the temperature-sensitive element 10 includes an element main body 11 and a pair of lead wires 12, 12 drawn out from the element main body 11.

Preferably, the element main body 11 is constituted by a thermistor. The thermistor has the property that the electrical resistance changes greatly in response to the change in temperature. There are a NTC (negative temperature coefficient) thermistor in which the resistance value decreases when the temperature increases and a PTC (positive temperature coefficient) thermistor in which the resistance value is constant to a certain temperature and the resistance value increases sharply from the certain temperature. As the element main body 11, without being limited to a thermistor, another known temperature-sensitive element can be used.

The lead wires 12, 12 electrically connect the element main body 11 and the lead frames 40. As the lead wires 12, 12, typically, a dumet wire is used, but another electrical wire may be used. The dumet wire is a composite wire in which an iron-nickel alloy is disposed at the center and copper with a high electrical conductivity is cladded at an outer layer.

The temperature-sensitive element 10 includes a sealing body 13 composed of glass, and the sealing body 13 covers the element main body 11 and a predetermined range of the lead wires 12, 12 connected with the element main body 11.

[Case 20]

Next, the case 20 will be described with reference to FIG. 1A, FIG. 1B, FIG. 2A and FIG. 2B.

The case 20 has two functions. The first function is a function to accommodate the temperature-sensitive element 10 and a part of the lead frames 40, and the second function is a function to fix the temperature sensor 1 to a measurement object and to transfer the heat of the measurement object from the site of the connection with the measurement object toward the temperature-sensitive element 10.

The case 20 having the two functions includes an accommodating and holding portion 21 and the lug terminal portion 31.

In the case 20, the accommodating and holding portion 21 and the lug terminal portion 31 are integrally formed, by performing machining such as punching and folding to a metal plate. For securing the heat transfer function, it is preferable that the case 20 be composed of a metal material having a high heat conductivity, for example, an aluminum alloy or a copper alloy.

As shown in FIG. 1A, FIG. 1B, FIG. 2A and FIG. 2B, the accommodating and holding portion 21 includes a support wall 22, a pair of side walls 23, 23 standing from both edges of the support wall 22 in the width direction W, and a front wall 27 standing at a front end side of the support wall 22 in the longitudinal direction L. The support wall 22, the side walls 23 and the front wall 27 each have a flat shape with a uniform thickness.

The accommodating and holding portion 21 includes an accommodating space 28 surrounded by the support wall 22, the side walls 23, 23 opposing to the support wall 22 and the front wall 27. In the accommodating space 28, distal end portions of the side walls 23, 23 and the front wall 27 are opened, and rear end sides of the side walls 23, 23 and the support wall 22 are opened. The temperature-sensitive element 10 and a part of the lead frames 40 are accommodated in the accommodating space 28, and are held through the filler 50 for the accommodating and holding portion 21.

As shown in FIG. 1B and FIG. 2A, each side wall 23 is formed such that the top at a central portion in the front-rear direction is higher and the top at both end portions is lower. The height of the top herein is the size measured from the support wall 22. The above-described high-top central portion of each side wall 23 configures a connection part 24. Furthermore, each side wall 23 includes, as supports, a front support 25 provided on the front side of the connection part 24 and a rear support 26 provided on the rear side of the connection part 24. The front support 25 and the rear support 26 are provided at two locations between which the connection part 24 is interposed, in the front-rear direction.

As shown in FIG. 1B, on each of the side walls 23, 23, a vent hole 30 passing through the front and back sides is formed at the midpoint in the longitudinal direction L. The vent hole 30 is provided such that the filler 50 described later reaches the whole of the interior of the accommodating space 28 when the air in the accommodating space 28 is discharged to the exterior in a step of filling the filler 50 into the accommodating space 28.

The connection parts 24 are used for fixing the temperature sensor 1 to the circuit board 90. Specifically, the connection parts 24 are inserted into cuts 91 formed on the circuit board 90 and having a wide-width slit shape in planar view, and thereby, the temperature sensor 1 is fixed to the circuit board 90 together with the lead frames 40. The connection parts 24 stand from the side walls 23, so as to be orthogonal to the support wall 22. In the cuts 91, portions into which a pair of connection parts 24, 24 is inserted have an equivalent size in the width direction W to the size in the width direction W that is determined by the connection parts 24, 24.

As shown in FIG. 1A and FIG. 1B, the front supports 25 protrude from the respective side walls 23 to the outsides in the width direction W. The front support 25 is parallel to the support wall 22, and a contacting surface 251 of the front support 25 contacts with a surface of an outer frame 92 joined to the circuit board 90. By fixing the temperature sensor 1 to the circuit board 90 while the contacting surface 251 contacts with the surface of the outer frame 92, it is possible to perform the positioning of the case 20 in the height direction H while the circuit board 90 and the support wall 22 are kept in parallel. Thereafter, the outer frame 92 is removed from the circuit board 90.

Similarly to the front supports 25, the rear supports 26 protrude from the respective side wall 23 to the outsides in the width direction W. When the contacting surface 251 of the front support 25 comes into contact with the outer frame 92, a part of the rear support 26 is inserted into a groove (not illustrated) extending from the cuts 91 of the circuit board 90 in the width direction W. Thereby, the positioning of the temperature sensor 1 in the longitudinal direction L and the width direction W is performed.

Since the temperature sensor 1 is set on the circuit board 90 by the front supports 25 and the rear supports 26, it is possible to easily perform the positioning of the temperature sensor 1, and it is possible to maintain a state where the support wall 22 and a later-described heat transfer surface 33 of the lug terminal portion 31 are parallel to the circuit board 90. That is, when the circuit board 90 is parallel to a surface of the measurement object that comes into contact with the lug terminal portion 31, the heat transfer surface 33 can be made parallel to the surface of the measurement object that comes into contact with the lug terminal portion 31, and therefore, the lug terminal portion 31 tightly contacts with the measurement object in parallel, so that it is possible to accurately measure the temperature of the measurement object. Thus, the front supports 25 and the rear supports 26 regulate the relative positional relationship between the circuit board 90 as the attachment object and the heat transfer surface 33.

Next, as shown in FIG. 1A, in the lug terminal portion 31, the outer shape in planar view is a circle, and a screw hole 32 passing through the front and back sides is formed on the inner side. A ring-shaped portion in the periphery of the screw hole 32 is the heat transfer surface 33 that comes into contact with the measurement object. The lug terminal portion 31 can make one of the upper side surface and lower side surface in the figure contact with the measurement object, by the positional relationship between the circuit board 90 on which the temperature sensor 1 is mounted and the measurement object.

By screwing a screw into the measurement object through the screw hole 32, it is possible to fix the temperature sensor 1 to the measurement object, and to make the heat transfer surface 33 tightly contact with the measurement object. The heat transfer surface 33 that comes into contact with the measurement object is parallel to the circuit board 90.

The lug terminal portion 31 is joined to the accommodating and holding portion 21 by a joining portion 29 extending from the support wall 22 toward the forward side, and when the temperature sensor 1 is fixed to the measurement object, the joining portion 29 and the support wall 22 also have the function to transfer the heat.

[Lead Frame 40]

As shown in FIG. 2A and FIG. 2B, the lead frames 40 are electrically connected with the pair of lead wires 12, 12 of the temperature-sensitive element 10. Further, by being inserted into insertion holes 93 formed on the circuit board 90, the lead frames 40 are fixed to the circuit board 90, and are electrically connected with a corresponding circuit portion of the circuit board 90.

As shown in FIG. 1A and FIG. 2B, the lead frames 40 include a first terminal 41 and a second terminal 45 respectively corresponding to the lead wires 12, 12. The first terminal 41 and the second terminal 45 have the same basic configuration, except that the first terminal 41 and the second terminal 45 have symmetrical shapes to each other. Therefore, the configuration of the first terminal 41 will be described below.

The material of the first terminal 41 and the second terminal 45 may be an arbitrary material, as long as the purpose thereof can be achieved. For example, copper or a copper alloy having a good electrical conductance can be used. Further, a surface treatment, for example, plating may be performed to the surfaces of the first terminal 41 and the second terminal 45.

As shown in FIG. 1A and FIG. 2A, the first terminal 41 is connected with the lead wire 12, and includes a connection portion 42 extending along the longitudinal direction L, a diverging portion 43 communicating with the connection portion 42 on an identical plane, and an insertion portion 44 communicating with the diverging portion 43 and extending along the height direction H.

As shown in FIG. 2A, the connection portion 42 extends straight, and the lead wire 12 is placed on one of the upper and lower surfaces (in the embodiment, on the upper surface in the figure), so that the connection portion 42 and the lead wire 12 are electrically connected. For securing the electrical connection, it is preferable that the connection portion 42 and the lead wire 12 be jointed by welding or other means at a part or whole of the portions overlapping with each other.

The diverging portion 43 communicates with the connection portion 42 at a predetermined inclination angle, and opens in an expanding manner, toward the outside in the width direction W. Thereby, as shown in FIG. 1A and FIG. 2B, it is possible to expand the interval between the diverging portion 43 of the first terminal 41 and the diverging portion 43 of the second terminal 45 toward the rear side.

The insertion portion 44 is folded so as to be orthogonal to the connection portion 42 and the diverging portion 43, for the insertion into the insertion hole 93 formed on the circuit board 90. It is preferable that the distal end of the insertion portion 44 have a tapered shape, for facilitating the insertion into the insertion hole 93 formed on the circuit board 90.

[Filler 50]

As shown in FIG. 2A, the filler 50 covers at least a part of the connection portions between the lead wires 12, 12 of the temperature-sensitive element 10 and the connection portions 42, 42 of the lead frames 40 (the first terminal 41 and the second terminal 45), in the accommodating space 28 of the accommodating and holding portion 21, and holds the temperature-sensitive element 10 and the lead frames 40 in the accommodating and holding portion 21.

The filler 50 is composed of a resin material having an electrical insulation and having an adhesive force for the accommodating and holding portion 21, for example, an epoxy resin. The filler 50 may be configured by two layers of an inner layer 51 and an outer layer 53, that is, a plurality of resin layers, as shown in FIG. 2A, or may be configured by only one layer.

In the case where the soldering of the temperature sensor 1 to the circuit board 90 is performed by a reflow method, it is preferable that the difference in linear expansion coefficient between the filler 50 and the metal material composing the case 20 (in the embodiment, an aluminum alloy) be small, for preventing the filler 50 from being separated from the case 20 with the rise in temperature. Here, the linear expansion coefficient of pure aluminum is $24 \times 10^{-6}/°$ C., the linear expansion coefficient of the epoxy resin is $4 \times 10^{-5}/°$ C. to $8 \times 10^{-5}/°$ C., and the linear expansion coefficient of the epoxy resin is higher than that of the aluminum alloy. Hence, instead of composing the filler 50 with only the resin material, it is preferable to add an additive agent for adjusting the linear expansion coefficient of the whole of the filler 50, specifically, an additive agent having a lower linear expansion coefficient than the epoxy resin. As the additive agent, for example, aluminum oxide ($Al_2O_3$) particles can be used. The linear expansion coefficient of aluminum oxide is $7.2 \times 10^{-6}/°$ C. Further, the heat conductivity of aluminum oxide is 237 W/(m·K), the heat conductivity of the epoxy resin is 0.30 W/(m·K), and the heat conductivity of the aluminum oxide is higher than that of the epoxy resin. Therefore, by adding aluminum oxide, it is possible to enhance also the heat conductivity of the filler 50.

It is preferable that the particle of the aluminum oxide be formed in a leaf shape or thin-plate shape instead of a spherical shape, for avoiding the particle from settling down in the resin when the resin composing the filler 50 melts.

The additive agent is not limited to aluminum oxide, and for example, an aluminum compound such as aluminum hydroxide ($Al(OH)_3$) and a titanium compound such as titanium oxide ($TiO_2$) can be used.

The element main body 11 of the temperature-sensitive element 10 covered with the filler 50 is held in the interior of the accommodating space 28, in a state where the element main body 11 is strongly fixed at predetermined intervals from the support wall 22, the side walls 23, 23 and the front wall 27. It is preferable that the element main body 11 be disposed so as to be as close to the support wall 22, which is the heat transfer surface, as possible.

The first terminal 41 and the second terminal 45 are covered with the filler 50, while the electrical connection with the lead wires 12, 12 is kept. The first terminal 41 and the second terminal 45 are also held in the interior of the accommodating space 28, at predetermined intervals from the support wall 22, the side walls 23, 23 and the front wall 27.

It is preferable that the filler 50 cover even the distal ends of the lead wires 12, 12, for securing the state of the connection between the lead wires 12, 12 and the lead frames 40 (the first terminal 41 and the second terminal 45). However, as shown in FIG. 2B, minute areas of the distal ends of the lead wires 12, 12 may be exposed.

[Production Method for Temperature Sensor 1]

Next, a procedure for producing the temperature sensor 1 will be described with reference to FIG. 3A, FIG. 3B, FIG. 3C and FIG. 3D.

The production method includes a connecting step, a covering step, a disposing step, a filling step and a hardening step.

Figure 4:
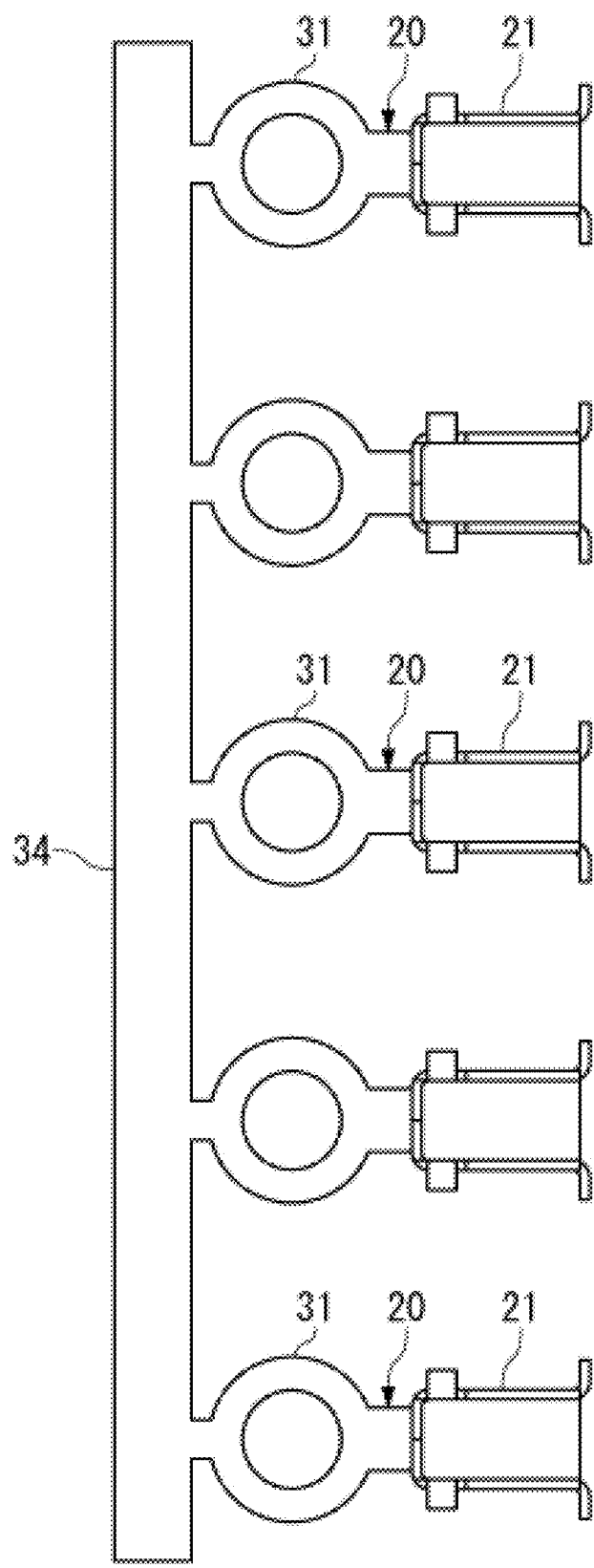
FIG. 4 is a diagram showing a state where a case to be used for the production of the temperature sensor according to the first embodiment is joined to a carrier.

In the production method, as shown in FIG. 4, the case 20 is provided as a member in which a plurality of precursors of the cases 20 is joined in parallel by a carrier 34 on the side of the lug terminal portion 31. Although the illustration is omitted, the lead frames 40 are also provided as a member in which the lead frames 40 are joined in parallel by the carrier on the side of the connection portion 42.

[Connecting Step (FIG. 3A)]

The connecting step is a step of electrically connecting the temperature-sensitive element 10 and the lead frames 40.

Specifically, first, the side of the insertion portions 44 of the plurality of lead frames 40 joined by the carrier is fixed by an unillustrated jig, and in this state, the carrier is detached. Since the plurality of lead frames 40 is fixed by the jig, the arrayed state is maintained even after the carrier is detached.

Then, the lead wires 12 of the temperature-sensitive element 10 are placed on the connection portions 42 of the lead frames 40, and in the contact state, the lead wires 12 and the connection portions 42 are connected by welding.

[Covering Step (FIG. 3B)]

Next, the temperature-sensitive element 10 and a part of the lead frames 40 are covered with the inner layer 51 composed of the filler 50.

Specifically, the temperature-sensitive element 10 and a part of the lead frames 40 are immersed in an unillustrated epoxy resin tank, and thereby, the epoxy resin composing the inner layer 51 is attached to the temperature-sensitive element 10 and a part of the lead frames 40. After the lifting from the epoxy resin tank, the attached epoxy resin is heated and hardened, so that the inner layer 51 is formed. Most of the lead wires 12 is covered with the inner layer 51, and therefore, by the hardened inner layer 51, the temperature-sensitive element 10 including the lead wires 12 is jointed to the lead frames 40, with a high rigidity.

[Disposing Step (FIG. 3C)]

Next, the temperature-sensitive element 10 and lead frames 40 on which the inner layer 51 is formed are disposed at a predetermined position in the accommodating and holding portion 21 of the case 20.

Specifically, the lug terminal portion 31 and the carrier 34 joining the lug terminal portion 31 are fixed by an unillustrated jig. Next, the portion where the inner layer 51 is formed and a part of the lead frames 40 are accommodated in the accommodating and holding portion 21, such that the insertion portions 44 of the lead frames 40 are oriented upward. The inner layer 51 and the lead frames 40 are held at a position where they do not contact with the support wall 22, side walls 23 and front wall 27 of the accommodating and holding portion 21.

[Filling Step, Hardening Step (FIG. 3D)]

Next, the epoxy resin composing the outer layer 53 is filled into the accommodating and holding portion 21, and is hardened, and thereby the filler 50 is formed.

Specifically, a solid epoxy resin composing the outer layer 53 is placed on the temperature-sensitive element 10 and lead frames 40 held by the accommodating and holding portion 21. The epoxy resin is placed at room temperature.

Next, the epoxy resin composing the outer layer 53 is heated, and the viscosity is decreased, so that the epoxy resin reaches the gap between the accommodating and holding portion 21 and the inner layer 51. Here, the vent hole 30 is provided on the case 20, and therefore, when the epoxy resin is filled, the air in the accommodating space 28 is discharged to the exterior, so that the epoxy resin can reach the whole of the interior of the accommodating space 28.

Then, after the epoxy resin composing the outer layer 53 reaches the gap, the outer layer 53 is heated to a further higher temperature, and is hardened. Thereby, the outer layer 53 (the filler 50) is surrounded from four directions, by the support wall 22, the front wall 27 and the pair of the side walls 23, 23.

Thereafter, the carrier 34 joined to the side of the lug terminal portion 31 is detached from the case 20. As a result, the sequential production method for the temperature sensor 1 in the embodiment is completed.

[Effect of Temperature Sensor 1]

Effects of the temperature sensor 1 in the embodiment and the production method therefor will be described below.

As shown in FIG. 1A, FIG. 1B, FIG. 2A and FIG. 2B, the temperature sensor 1 includes the lead frames 40 and the case 20 having the heat transfer surface 33 that comes into contact with the measurement object, and the lead frames 40 connected with the temperature-sensitive element 10 by the lead wires 12 serve for the electrical connection with the circuit board 90. Further, the lead frames 40 are strongly fixed to the case 20 by the filler 50.

Accordingly, it is possible to reduce the workload when the temperature sensor 1 is mounted on the circuit board 90. That is, when the lead wires 12 serve for the electrical connection with the circuit board 90 of the temperature-sensitive element 10 as in the case of Patent Literature 1, it is necessary to perform a step of inserting the distal ends of the lead wires 12 into the insertion holes 93 formed on the circuit board 90, in addition to a step of setting the case 20 on the circuit board 90. On the other hand, in the temperature sensor 1, the lead frames 40 are strongly fixed to the case 20 through the filler 50. The lead frames 40 have a higher rigidity than electrical wires, and therefore, in the case of using lead frames that match with the distance from the case 20 to the insertion holes 93, the lead frames 40 are inserted into the insertion holes 93 of the circuit board 90, simply by attaching the case 20 to the cuts 91 of the circuit board 90 after position adjustment. Accordingly, the temperature sensor 1 makes it possible to decrease work steps when the temperature sensor 1 is mounted on the circuit board 90, and to enhance the work efficiency.

Further, in the case of using electrical wires, when the temperature sensor 1 is mounted on the circuit board 90, it is necessary to provide some length margin in the electrical wires for inserting the distal ends of the electrical wires into the insertion holes 93. Therefore, after the wiring of the electrical wires, the electrical wires occupy the space in the periphery of the circuit board 90, by an amount equivalent to the provided length margin. On the other hand, the lead frames 40 do not occupy the space in the periphery of the circuit board 90, because it is not necessary to provide the margin, unlike electrical wires. Therefore, it is possible to achieve space saving.

Further, by the front support 25 and rear support 26 provided in the case 20, it is possible to easily perform the positioning of the temperature sensor 1 when the circuit board 90 is mounted, and further, it is possible to dispose the support wall 22 parallel to the circuit board 90. When the temperature sensor 1 having a determined attitude is attached to the circuit board 90 in this way, the heat transfer surface of the temperature sensor 1 has a determined attitude relative to the measurement object. Therefore, it is possible to make the heat transfer surface 33 of the lug terminal portion 31 tightly contact with the measurement object.

Particularly, the front supports 25 and the rear supports 26 are provided on the front side and rear side of the connection part 24, at the plurality of locations, at a predetermined interval. Therefore, it is possible to stably obtain the parallel state of the support wall 22 and the circuit board 90.

Next, the temperature sensor 1 in the embodiment can accurately sense the temperature of the measurement object. That is, as shown in FIG. 1A, FIG. 1B, FIG. 2A and FIG. 2B, the case 20 of the temperature sensor 1 surrounds the filler 50 from the four direction of the support wall 22, the front wall 27 and the pair of side walls 23, 23 of the accommodating and holding portion 21. Therefore, according to the temperature sensor 1, in a wide area, heat is transferred to the temperature-sensitive element 10 through the filler 50, and therefore, it is possible to rapidly transfer the temperature of the measurement object to the temperature-sensitive element 10.

Furthermore, the filler 50 contains the additive agent for adjusting the linear expansion coefficient of the whole, and therefore, the difference in linear expansion coefficient between the case 20 and the filler 50 is small.

Therefore, according to the temperature sensor 1, even when the soldering to the circuit board 90 is performed by the reflow method, it is possible to prevent the production of a gap between the case 20 and the filler 50 and the production of a crack in the filler 50, and therefore, it is possible to prevent the decrease in the performance of the heat transfer to the element main body 11 through the filler 50.

[Modification 1 of First Embodiment]

Figure 5A:
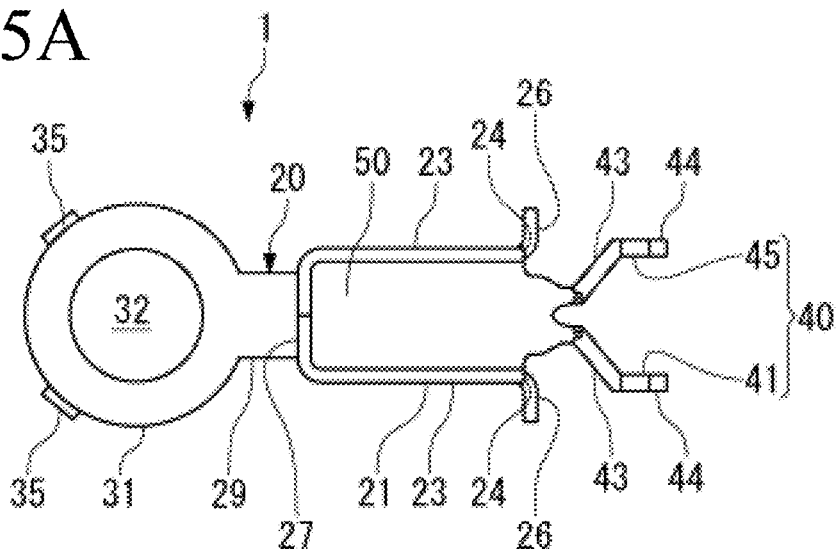
FIG. 5A, FIG. 5B and FIG. 5C each show a modification of the temperature sensor according to the first embodiment.
Figure 5B:
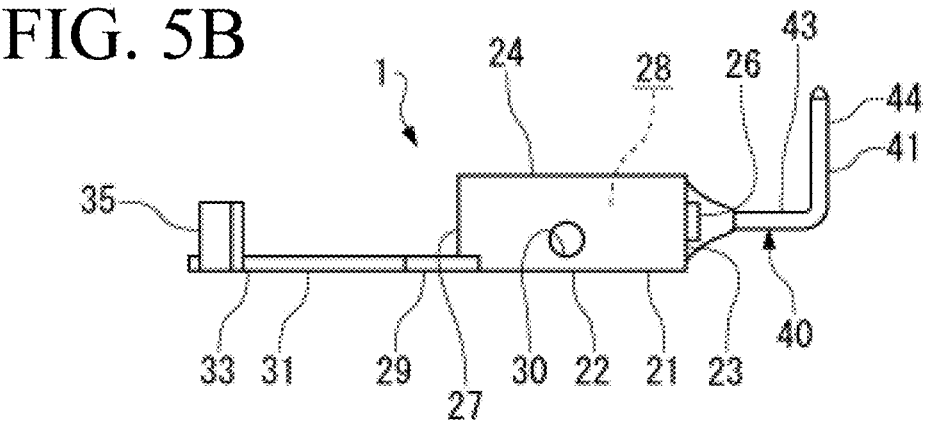
Figure 5C:
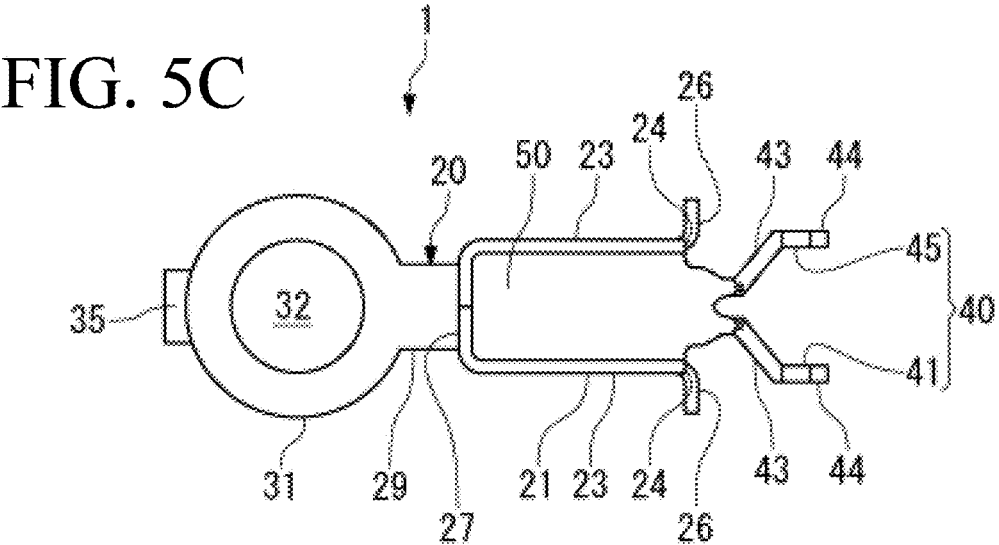

FIG. 5A, FIG. 5B and FIG. 5C each show a modification of the first embodiment.

A temperature sensor 1 according to the modification provides front supports 35 at the lug terminal portion 31, instead of providing the front supports 25 in the case 20.

Specifically, as shown in FIG. 5A, a pair of front supports 35, 35 is provided near the front end of the lug terminal portion 31. As shown in FIG. 5B, each of the front supports 35 is joined to the lug terminal portion 31, on a side surface thereof, and stands in the height direction H such that the orientation is the same as that of the rear support 26 in the case 20. The distal end of the front support 35 has the same height as the rear support 26

With the modification shown in FIG. 5A, it is possible to make the interval between the front support 35 and the rear support 26 wider than the interval between the front support 25 and the rear support 26 in the first embodiment, and therefore, it is possible to keep the parallel state of the case of the temperature sensor 1 and the circuit board 90, more stably.

The pair of front supports 35, 35 may be provided on the side close to the joining portion 29. Furthermore, as shown in FIG. 5C, by providing only one front support 35 at the front end of the lug terminal portion 31, the case 20 may be supported at three points of the front support 35 and the pair of the rear supports 26, 26.

Second Embodiment

Next, a temperature sensor 2 according to a second embodiment of the present invention will be described with reference to FIG. 6A, FIG. 6B and FIG. 6C.

As shown in FIG. 6A, in the temperature sensor 2, lead frames 60 held in a case 80 are longer than those of the temperature sensor 1 in the first embodiment, and the first terminal 41 and the second terminal 45 extend in parallel from the front ends to the rear ends, in planar view. In the second embodiment, for the same constituent elements as the first embodiment, the same reference numerals as the first embodiment are used. As for the temperature sensor 2, differences from the temperature sensor 1 will be mainly described below.

As shown in FIG. 6A and FIG. 6B, each of the first terminal 41 and the second terminal 45 of the lead frames 60 includes a first horizontal portion 61 extending along the longitudinal direction L, a first vertical portion 62 joined to the first horizontal portion 61, a second horizontal portion 63 joined to the first vertical portion 62, and a second vertical portion 64 joined to the second horizontal portion 63 and configuring the connection portion 42. The first horizontal portion 61 and the second horizontal portion 63 are parallel to the support wall 22 of the case 20, and the first vertical portion 62 and the second vertical portion 64 are parallel to the front wall 27 of the case 20. As shown in FIG. 6C, the first horizontal portion 61 serves as the connection portion 42.

In the lead frames 60, since the first terminal 41 and the second terminal 45 are long, there is a concern of the contact between the first terminal 41 and the second terminal 45, when the temperature sensor 2 is vibrated while being mounted on the circuit board 90 and is used. Hence, in the temperature sensor 2, a spacer 70 is provided between the first terminal 41 and the second terminal 45, for maintaining the interval between the first terminal 41 and the second terminal 45 and preventing the contact between the first terminal 41 and the second terminal 45. The spacer 70 is provided by the insert molding with an epoxy resin.

As shown in FIG. 6A and FIG. 6B, the spacer 70 covers continuously the whole of the lead frames 60 (the first terminal 41 and the second terminal 45) drawn out from the case 80, except the second vertical portion 64. However, the spacer 70 may be intermittently provided as long as the interval between the first terminal 41 and the second terminal 45 can be maintained. In the case of providing intermittently the spacer 70, it is possible to reduce a cavity to be formed by a metal mold that is used at the time of the insert molding for an individual spacer 70, compared to the spacer 70 that covers continuously the whole of the lead frames 60, and it is possible to easily make the epoxy resin reach the whole.

In the temperature sensor 2, unlikely the temperature sensor 1 in the first embodiment, the case 80 is not fixed to the circuit board 90 that is the attachment object.

Further, in the temperature sensor 2, the center of the screw hole 32 on the lug terminal portion 31 deviates from the center of the case 20 in the width direction W to one side in the width direction W. In this way, the lug terminal portion 31 may be eccentrically provided from the case 20, depending on the feature of the periphery where the lug terminal portion 31 is provided.

The present invention has been described above based on the preferred embodiments. Without departing from the spirit of the present invention, some of the constituents mentioned in the above embodiments can be selected, or can be appropriately modified to other constituents.

In the above-described first embodiment, it is assumed that the support wall 22 in the temperature sensor 1 and the circuit board 90 are parallel, but the present invention is not limited to this. In the case where the circuit board 90 and the heat transfer surface of the measurement object are inclined, it is possible to adjust the attitude of the support wall 22 relative to the circuit board 90, in accordance with the inclination.

Further, in the filler 50, in consideration of the case where the soldering of the temperature sensor 1 to the circuit board 90 is performed by the reflow method, the epoxy resin containing aluminum oxide particles is used as the additive agent for adjusting the liner expansion coefficient, but the present invention is not limited to this. When the soldering is performed by means other than the reflow method, a resin containing no additive agent may be used.

In the above-described first and second embodiments, the lug terminal portion 31 is joined to the accommodating and holding portion 21, by the joining portion 29 extending from the support wall 22 in the forward direction, but the present invention is not limited to this. The lug terminal portion 31 may be joined to the accommodating and holding portion 21, by a joining portion extending from the front wall 27 or the side wall 23 in the height direction H.

In the above-described first and second embodiments, the temperature sensors 1, 2 including the lug terminal portion 31 in the case 20 have been described. However, the present invention is not limited to this, and can be widely applied to temperature sensors including a case having a heat transfer surface that comes into contact with the measurement object. Further, in the first and second embodiments, the support wall 22 of the case 20 is also adopted as a heat transfer surface. However, by the contact of the front wall 27 or the side wall 23 with the measurement object, the front wall 27 or the side wall 23 may be adopted as a heat transfer surface. Furthermore, the case 20 has a shape in which the filler 50 is surrounded from four directions, but without being limited to this, may have a shape in which the filler 50 is surrounded from four or more directions.

In the temperature sensor 1 in the first embodiment, the pair of front supports 25 is provided at the same position in the longitudinal direction L, but may be provided at different positions in the longitudinal direction L. The same goes for the rear supports 26.

Further, in the temperature sensor 1, the contacting surface 251 of the front support 25 contacts with the surface of the outer frame 92 joined to the circuit board 90, but the present invention is not limited to this. The contacting surface 251 of the front support 25 may contact with a surface of the circuit board 90 itself or a surface of another member that is adjacent to the measurement object and is removed thereafter.

REFERENCE SIGNS LIST 1, 2 Temperature sensor
10 Temperature-sensitive element
11 Element main body
12 Lead wire
13 Sealing body
20 Case
21 Accommodating and holding portion
22 Support wall
23 Side wall
24 Connection part
25 Front support
251 Contacting surface
26 Rear support
27 Front wall
28 Accommodating space
29 Joining portion 30 Vent
31 Lug terminal portion
32 Screw hole
33 Heat transfer surface
34 Carrier
35 Front support
40 Lead frame
41 First terminal
42 Connection portion
43 Diverging portion
44 Insertion portion
45 Second terminal
50 Filler
51 Inner layer
53 Outer layer
60 Lead frame
61 First horizontal portion
62 First vertical portion
63 Second horizontal portion
64 Second vertical portion
70 Spacer
90 Circuit board
91 Cut
92 Outer frame
93 Insertion hole
H Height direction
L Longitudinal direction
W Width direction

The invention claimed is:

1. A temperature sensor comprising:
a temperature-sensitive element including an element main body and a pair of lead wires that is drawn out from the element main body;
a case accommodating the temperature-sensitive element, wherein a lug terminal extends from a side of the case opposite from the temperature-sensitive element, the lug terminal having a heat transfer surface configured to come into physical contact with a surface of a measurement object for a temperature measurement, wherein the surface of the measurement object is parallel to the heat transfer surface, and wherein the lug terminal is configured to fix the case to the measurement object;
a pair of lead frames electrically connected with each of the lead wires and drawn out from the case; and
a filler covering the temperature-sensitive element accommodated in the case and a part of the lead frames and holding the temperature-sensitive element and the lead frames in the case while maintaining a state of the connection.

2. The temperature sensor according to claim 1, wherein the filler covers at least a part of connection portions between the lead wires and the lead frames, in an interior of the case or in the interior and exterior of the case.

3. The temperature sensor according to claim 2, wherein the temperature sensor is configured to measure the temperature of the measurement object while being attached to an attachment object, and
the case includes a connection part on a side opposing to the heat transfer surface, the connection part being configured to serve for connection with the attachment object.

4. The temperature sensor according to claim 2, wherein the pair of lead frames includes a spacer configured to maintain an interval between them.

5. The temperature sensor according to claim 1, wherein the case surrounds the filler.

6. The temperature sensor according to claim 5, wherein the temperature sensor is configured to measure the temperature of the measurement object while being attached to an attachment object, and
the case includes a connection part on a side opposing to the heat transfer surface, the connection part being configured to serve for connection with the attachment object.

7. The temperature sensor according to claim 5, wherein the pair of lead frames includes a spacer configured to maintain an interval between them.

8. The temperature sensor according to claim 1, wherein the temperature sensor is configured to measure the temperature of the measurement object while being attached to an attachment object, and
the case includes a connection part on a side opposing to the heat transfer surface, the connection part being configured to serve for connection with the attachment object.

9. The temperature sensor according to claim 8, wherein the case includes a support configured to regulate a relative positional relationship between the attachment object and the heat transfer surface.

10. The temperature sensor according to claim 8, wherein the attachment object is a circuit board and the case is composed of a metal material.

11. The temperature sensor according to claim 1, wherein the temperature sensor is configured to measure the temperature of the measurement object while being attached to an attachment object, and
the case includes a support configured to regulate a relative positional relationship between the attachment object and the heat transfer surface.

12. The temperature sensor according to claim 11, wherein
the support is provided at a plurality of locations in a front-rear direction in which the lead frames are drawn out, the plurality of locations being configured to interpose the connection part.

13. The temperature sensor according to claim 11, wherein
the attachment object is a circuit board,
the case includes the support for attaching the case to the circuit board, and
the support is configured to regulate a relative positional relationship between the circuit board and the heat transfer surface when the case is attached to the circuit board.

14. The temperature sensor according to claim 1, wherein the pair of lead frames includes a spacer configured to maintain an interval between them.

15. The temperature sensor according to claim 1, wherein the lug terminal includes a ring-shaped portion as the heat transfer surface.

16. The temperature sensor according to claim 1, wherein vent holes are formed in respective opposite sides of the case, the vent holes being configured to permit the filler to reach a whole of an interior of the case when air in said interior is discharged to an exterior of the case.

17. The temperature sensor according to claim 1, wherein each lead frame of the pair of lead frames includes a connection portion and an insertion portion, wherein the insertion portion is disposed entirely outside of the case and is arranged perpendicular with respect to the connection portion.

18. A temperature sensor comprising:
a temperature-sensitive element including an element main body and a pair of lead wires that is drawn out from the element main body;
a case accommodating the temperature-sensitive element;
a pair of lead frames electrically connected with each of the lead wires and drawn out from the case; and
a filler covering the temperature-sensitive element accommodated in the case and a part of the lead frames and holding the temperature-sensitive element and the lead frames in the case while maintaining a state of the connection,
the pair of lead frames are configured to be fixed to a circuit board that is an attachment object;
wherein a lug terminal extends from a side of the case opposite from the temperature-sensitive element, the lug terminal having a heat transfer surface configured to come into contact with a measurement object for a temperature measurement, and the lug terminal being configured to fix the case to the measurement object.

19. The temperature sensor according to claim 18, wherein vent holes are formed in respective opposite sides of the case, the vent holes being configured to permit the filler to reach a whole of an interior of the case when air in said interior is discharged to an exterior of the case.

20. The temperature sensor according to claim 18, wherein each lead frame of the pair of lead frames includes a connection portion and an insertion portion, wherein the insertion portion is disposed entirely outside of the case and is arranged perpendicular with respect to the connection portion.

* * * * *